United States Patent
Koh

(10) Patent No.: US 7,343,214 B2
(45) Date of Patent: Mar. 11, 2008

(54) DIE-LEVEL TRACEABILITY MECHANISM FOR SEMICONDUCTOR ASSEMBLY AND TEST FACILITY

(75) Inventor: Horne Loong Koh, San Jose, CA (US)

(73) Assignee: Applied Materials, Inc., Santa Clara, CA (US)

(*) Notice: Subject to any disclaimer, the term of this patent is extended or adjusted under 35 U.S.C. 154(b) by 85 days.

(21) Appl. No.: 11/247,196

(22) Filed: Oct. 12, 2005

(65) Prior Publication Data

US 2006/0085089 A1  Apr. 20, 2006

Related U.S. Application Data

(60) Provisional application No. 60/618,805, filed on Oct. 15, 2004.

(51) Int. Cl.
*G06F 19/00* (2006.01)
(52) U.S. Cl. .................................. 700/115; 700/121
(58) Field of Classification Search ........ 700/108–110, 700/115, 121, 215, 225, 228–230
See application file for complete search history.

(56) References Cited

U.S. PATENT DOCUMENTS

| | | | |
|---|---|---|---|
| 5,294,812 A | | 3/1994 | Hashimoto et al. |
| 5,751,581 A | * | 5/1998 | Tau et al. ................... 700/115 |
| 5,889,674 A | | 3/1999 | Burdick et al. |
| 6,065,113 A | | 5/2000 | Shiell et al. |
| 6,192,291 B1 | * | 2/2001 | Kwon ........................ 700/121 |
| 6,216,055 B1 | * | 4/2001 | Balamurugan et al. ..... 700/121 |
| 6,351,684 B1 | * | 2/2002 | Shirley et al. ............... 700/121 |

(Continued)

FOREIGN PATENT DOCUMENTS

JP  11087535  3/1999

(Continued)

OTHER PUBLICATIONS

Mar. 6, 2006. International Search Report and Written Opinion from PCT Application No. PCT/US2005/036548.

(Continued)

*Primary Examiner*—Leo Picard
*Assistant Examiner*—Carlos Ortiz-Rodriguez
(74) *Attorney, Agent, or Firm*—Blakely, Sokoloff, Taylor & Zafman

(57) ABSTRACT

Embodiments of the present invention provide a novel method, system and computer program product for tracing die units during material transfer from, for example, one factory or lot to another (and efficiently maintaining correspondence between die data and an individual die during, e.g., a lot transfer process). One or more embodiments of the present invention are intended to improve the mechanism of die-level traceability by assigning individual die IDs to each die unit in, e.g., each lot, and associating a range of die IDs with a corresponding index string. When, for example, some dies are transferred from, e.g., a first lot to a second lot, the entire die information associated with the first lot is copied to the second lot, and a different index string is assigned to the second lot to indicate the actual dies or range of dies that have been transferred. The first lot's index string is then adjusted to indicate the dies remaining after the transfer.

31 Claims, 9 Drawing Sheets

U.S. PATENT DOCUMENTS

| | | | |
|---|---|---|---|
| 6,400,840 | B2 | 6/2002 | Wilson et al. |
| 6,427,092 | B1 | 7/2002 | Jones et al. |
| 6,588,854 | B2 | 7/2003 | Wilson et al. |
| 6,616,034 | B2 | 9/2003 | Wu et al. |
| 6,622,102 | B2 | 9/2003 | Skidmore |
| 6,792,365 | B2 | 9/2004 | Raitter |
| 6,792,563 | B1 | 9/2004 | DesRosier et al. |
| 6,941,556 | B1 | 9/2005 | Kessler et al. |
| 6,959,226 | B2 * | 10/2005 | Hsieh .................. 700/115 |
| 2001/0021265 | A1 | 9/2001 | Wilson et al. |
| 2001/0026949 | A1 | 10/2001 | Ogawa et al. |
| 2001/0036677 | A1 | 11/2001 | Hiroyuki et al. |
| 2002/0004767 | A1 | 1/2002 | Chikashi et al. |
| 2002/0017708 | A1 | 2/2002 | Takagi et al. |
| 2002/0038779 | A1 | 4/2002 | Beffa |
| 2002/0076897 | A1 | 6/2002 | Peterson |
| 2002/0081756 | A1 | 6/2002 | Asahina et al. |
| 2002/0110270 | A1 | 8/2002 | Wilson et al. |
| 2002/0132060 | A1 | 9/2002 | Corbett |
| 2002/0183884 | A1 | 12/2002 | Jones et al. |
| 2003/0062609 | A1 | 4/2003 | Funatsu |
| 2003/0103628 | A1 | 6/2003 | Luc et al. |
| 2003/0106931 | A1 | 6/2003 | Wu et al. |
| 2003/0141605 | A1 | 7/2003 | Lee et al. |
| 2003/0157762 | A1 | 8/2003 | Peterson |
| 2003/0158795 | A1 | 8/2003 | Markham et al. |
| 2003/0203591 | A1 | 10/2003 | Corbett |
| 2003/0224540 | A1 | 12/2003 | Watanabe et al. |
| 2004/0000744 | A1 | 1/2004 | Grigg et al. |
| 2004/0005090 | A1 | 1/2004 | Wilson et al. |
| 2004/0006404 | A1 | 1/2004 | McAdams et al. |
| 2004/0034785 | A1 | 2/2004 | Horng-Ming et al. |
| 2004/0087113 | A1 | 5/2004 | Muraishi |
| 2004/0095172 | A1 | 5/2004 | Usami |
| 2004/0124437 | A1 | 7/2004 | Doudoumopolous |
| 2004/0176872 | A1 | 9/2004 | Eidemiller |
| 2004/0225385 | A1 | 11/2004 | Takagi et al. |
| 2004/0251472 | A1 | 12/2004 | Catalasan et al. |
| 2004/0256463 | A1 | 12/2004 | Kudo |
| 2005/0042780 | A1 | 2/2005 | Matsunami |
| 2005/0187737 | A1 | 8/2005 | Toyoshima et al. |

FOREIGN PATENT DOCUMENTS

| | | |
|---|---|---|
| WO | WO-98/14984 | 4/1998 |
| WO | WO-2004/049231 | 6/2004 |

OTHER PUBLICATIONS

Card et al. "Beyond AEC and APC: Wafer quality control." Solid State Technology, vol. 48, Issue 4. (Abstract) Apr. 2005.

Chylak, B et al. "Packaging for Multi-Stack Die." Semiconductor International, vol. 27, No. 6 (Abstract). Jun. 2004.

Fegley, C. R. et al. "Automatic detection of ink-marked semiconductor chips." Technical Digest, No. 59. (Abstract) Jul. 1980.

Freed et al. "Autonomous On-Wafer Sensors for Process Modeling, Diagnosis, and Control." IEEE TSM, vol. 14, No. 3. Aug. 2001.

Hutchins, G. L. "Semiconductor chip traceability method." IBM Technical Disclosure Bulletin, vol. 23, No. 5. (Abstract) Oct. 1980.

Lerman. "Traceability via Voice Data Entry." IEEE Transactions on Components, Hybrids, and Manufacturing Technology, Vol. CHMT-3, No. 3 (Abstract). Sep. 1980.

Miller, J. G. et al. "Implementing a fully automatic macro defect detection and classification system in a high-production semiconductor fab." Journal of Microlithography, Microfabrication, and Microsystems, vol. 2, No. 1. (Abstract) Jan. 2003.

Mora. "China launches 300mm manufacturing." Solid State Technology, vol. 48, No. 2, pp. 63-65. Feb. 2005.

Owens, M. M. et al. "Rapid Prototype Fabrication of Custom Chip Scale Packages." Materials, Integration and Packaging Issues for High-Frequency Devices Symposium. (Abstract) 2004.

Perrottet, D. et al. "High-speed chip marking." European Semiconductor, vol. 26, No. 8. (Abstract) Aug. 2004.

Peters. "Sampling Size: What the Books Don't Tell You." Semiconductor International, vol. 28, No. 3, p. 34. Mar. 2005.

Saitoh, F. "Semiconductor bare chip ID recognition using combinational Hough transform." Journal of the Japan Society of Precision Engineering, vol. 65, No. 1. (Abstract) Jan. 1999.

Scheiber "High-speed sensors address inspection." Test & Measurement World, vol. 25, Issue 4. (Abstract) May 2005.

Shindo et al. "Effective Excursion Detection by Defect Type Grouping in In-Line Inspection and Classification." IEEE TSM, vol. 12, No. 1. Feb. 1999.

Skinner et al. "Multivariate Statistical Methods for Modeling and Analysis of Wafer Probe Test Data." IEEE TSM, vol. 15, No. 4. Nov. 2002.

Suzuki et al. "New Microcharacters for Wafer Identification." IEEE TSM, vol. 14, No. 3. Aug. 2001.

Walker. "RVSI unit is first to announce new product for semiconductor theft prevention." Business Wire. (Abstract). Mar. 7, 1996.

Weber et al. "Quantifying the Value of Ownership of Yield Analysis Technologies." IEEE TSM, vol. 15, No. 4. Nov. 2002.

"Chip identification writing system." IBM Technical Disclosure Bulletin, vol. 27, No. 10A. (Abstract) Mar. 1985.

"Exclusive: slimmer, faster wafer reader." Control Engineering, vol. 52, Issue 7. (Abstract) July 2005.

Test & Mesurment World. vol. 25, Issue 7. (Abstract) Aug. 2005.

* cited by examiner

Before Transfer:

| LOT 1 | |
|---|---|
| Die ID String | lot1.1_x34_y47<br>lot1.1_x35_y47<br>lot1.1_x1_y48<br>.<br>.<br>.<br>lot1.2_x1_y1 |
| Additional String 1 | memoryW<br>memoryW<br>memoryX<br>.<br>.<br>.<br>memoryY |
| Index string | 1: 480 |

After Transfer from LOT1 to LOT2:

| LOT 1 | | LOT 2 | |
|---|---|---|---|
| Die ID String | lot1.1_x34_y47<br>lot1.1_x35_y47<br>lot1.1_x1_y48<br>.<br>.<br>.<br>lot1.2_x1_y1 | Die ID String | lot1.1_x34_y47<br>lot1.1_x35_y47<br>lot1.1_x1_y48<br>.<br>.<br>.<br>lot1.2_x1_y1 |
| Additional String 1 | memoryW<br>memoryW<br>memoryX<br>.<br>.<br>.<br>memoryY | Additional String 1 | memoryW<br>memoryW<br>memoryX<br>.<br>.<br>.<br>memoryY |
| Index string | 1:12, 25:480 | Index string | 13:24 |

Fig. 5

Before Merging LOT 3 into LOT 4:

| LOT 3 | |
|---|---|
| Die ID String | Lot3.1_x34_y47<br>Lot3.1_x35_y47<br>Lot3.1_x1_y48<br>.<br>. |
| Additional String 1 | memoryW<br>.<br>memoryW |
| Index string | 1:480 |

| LOT 4 | |
|---|---|
| Die ID String | Lot4.1_x34_y47<br>Lot4.1_x35_y47<br>Lot4.1_x1_y48<br>.<br>. |
| Additional String 1 | memoryX<br>.<br>memoryX |
| Index string | 201:680 |

After Merging LOT 3 into LOT 4:

| LOT 3 | |
|---|---|
| Die ID String | Lot3.1_x34_y47<br>Lot3.1_x35_y47<br>Lot3.1_x1_y48<br>.<br>. |
| Additional String 1 | memoryW<br>.<br>memoryW |
| Index string | 0:0 |

| LOT 4 | |
|---|---|
| Die ID String | Lot4.1_x34_y47<br>Lot4.1_x35_y47<br>Lot4.1_x1_y48<br>.<br>. |
| Additional String 1 | memoryX<br>.<br>memoryX |
| Index string | 201:680 |
| Die ID String | Lot3.1_x34_y47<br>Lot3.1_x35_y47<br>Lot3.1_x1_y48<br>.<br>. |
| Additional String 1 | memoryW<br>.<br>memoryW |
| Index string | 1:480 |

Fig. 6

DIE-LEVEL TRACEABILITY MECHANISM FOR SEMICONDUCTOR ASSEMBLY AND TEST FACILITY

This application claims priority under 35 U.S.C. §119 to U.S. Provisional Application No. 60/618,805, titled "Die-Level Traceability Mechanism for Semiconductor Assembly and Test Facility," filed Oct. 15, 2004, and assigned to Applied Materials, Inc., which is incorporated herein by reference in its entirety.

FIELD OF THE INVENTION

Embodiments of the present invention generally relate to systems and methods for tracing die units during material transfer from, for example, one factory or lot of a semiconductor assembly and test facility to another.

BACKGROUND OF THE INVENTION

In semiconductor chip manufacturing processes, multiple dies (also known as die units) are fabricated on a single wafer. These dies are later separated and packaged into individual chips. The yield of chips from each wafer is not 100% because of defects during the manufacturing process. The number of good die obtained from a wafer determines the yield. Die units are typically transferred from one facility to another, or lot to lot, for various manufacturing and quality control operations.

In order to keep track of the dies, each die unit on a wafer is assigned a unique identifier (Die ID), and each wafer is assigned to a grouping of wafers such as a lot. Wafers in a lot are sometimes tracked as Materials of the lot. Lot and Material objects in the Manufacturing Execution System (MES) are a representation of the physical items in the factory. The die IDs can be of any format and one convention is to use the coordinate position of the dies on the wafer as an identifier (or part of a die's identifier) where the die IDs can (but do not necessarily) contain information regarding the lot that the IDs are in. Any additional information corresponding to the dies are assigned into Additional Strings, which together with the combined Die IDs constitute the die information of the Lot or other Material. For example, users may want to add information such as product, grade, etc. to each die in the lot. Such information can be carried in the Additional strings. When the corresponding elements of the Die ID are matched with the Additional String, the information of the individual die, i.e. its ID and, say, its product can be obtained.

When there is a transfer of at least some of the die units from one lot to another, the corresponding die information along with its wafer and lot information needs to be passed to the new lot. This die information is useful in tracing, at the die unit level, an individual die's history in terms of operation undergone, carrier used for its transportation, the lot it belonged to at various times, and other historical information.

In a conventional assembly operation, die units may be drawn for processing from, for example, a first wafer within a first lot. Alternatively, die units can be drawn from multiple locations. Co-mingling good dies from various locations of a single wafer, from several wafers, and from several wafer lots is what typically occurs during the assembly operation. Unfortunately, whenever die units among multiple wafers and multiple lots are co-mingled, traceability as to a particular die unit is lost. If a die later proves unreliable in the field, it would be beneficial from the viewpoint of the manufacturer to identify the source of the die unit. It would also be desirable to determine how and when the die unit was manufactured. Such indicia could aid the manufacturer in improving the manufacturing process not only after the die units are shipped, but also possibly during tests of the die units before shipment.

Conventional techniques used to trace die units are primarily limited to manipulating die IDs when die units are transferred from one lot to another. Due to the large amount of information often involved and the complexity of this task, this manipulation can be a slow and burdensome process. It would thus be desirous to avoid the cumbersome process of adjusting the die IDs of both the transferred die units in the receiving object, and adjusting the die IDs of the die units remaining in the source object. Accordingly, the present invention is directed to these, as well as other important ends.

SUMMARY OF THE INVENTION

The present invention provides a novel method, system and computer program product for tracing die units during material transfer from, for example, one factory or lot to another and efficiently maintain correspondence between die data and an individual die during, e.g., a lot transfer process. One or more embodiments of the present invention are intended to improve the mechanism of die-level traceability by assigning individual die IDs to each die unit, e.g., each lot, and associating a range of die IDs with a corresponding index string. The die IDs may include wafer ID, X-coordinate, and Y-coordinate, and can include other die-related information. The die information of a lot or material object comprises the die IDs and Additional Strings. When, for example, some dies are transferred from, e.g., a first lot to a second lot, the entire die information associated with the first lot is copied to the second lot, and a different index string is assigned to the second lot to indicate the actual dies or ranges of dies that have been transferred. The first lot's index string is then adjusted to indicate the dies remaining in the first lot after the transfer. By using the index string, the dies in a particular lot can more efficiently be kept track of without the need to manipulate and/or selectively associate individual die IDs with differing lots (and the dies therein) in the course of, e.g., transferring selected dies from the first lot to the second lot.

Accordingly, the present invention relates to a method for tracing die units during manufacturing operations, which include the operative steps of assigning a first index string to a plurality of die strings that are in one-to-one correspondence to a plurality of die units, wherein the plurality of die units is associated with a source object, wherein each range of indices encompassed by the first index string identifies one of said plurality of die strings, upon transferring at least some of the die units from the source object to a receiving object, copying the plurality of die strings associated with the plurality of die units from the source object to a receiving object, assigning a second index string to the die strings associated with the die units transferred from the source object to the receiving object to indicate die units transferred to the receiving object, and adjusting the first index string in the source object to indicate die units remaining in the source object. More specifically, the die strings include wafer ID and die coordinates, each die coordinates includes an X-coordinate and Y-coordinate, the die strings include wafer ID and a range of number sequence, and the method die strings are generated from a die map of the source object. In one example, the source object is a plurality of wafers and the receiving object is a plurality of lead frames. In another example, the source object is a first plurality of lead frames and the receiving object is a second plurality of magazines.

In an example of the present invention, the method for tracing die units during manufacturing operations further includes the operative steps of assigning a plurality of user-defined strings in one-to-one correspondence to said plurality of die strings.

In another example of the present invention, the method for tracing die units during manufacturing operations further includes the operative steps of assigning a die picking order in one-to-one correspondence to said plurality of die string.

In yet another example of the present invention, the method for tracing die units during manufacturing operations further includes the operative steps of storing said index strings and die strings associated with the die units transferred from the source object to the receiving object, wherein the stored index strings and die strings trace the history of the die units, and generating a report comprising die unit trace information.

In one or more embodiments, the present invention relates to a system for tracing die units during manufacturing operations, which includes a processor to assign a first index string to a uniquely assigned plurality of die strings in one-to-one correspondence to a plurality of die units, wherein said plurality of die units is associated with a source object, wherein each indice within the first index string identifies one of said plurality of die strings, a tracking mechanism to track at least some die units transferred from the source object to a receiving object, wherein said tracking mechanism copies at least some die strings associated with the die units transferred from the source object to the receiving object, assigns a second index string to the die strings associated with the die units transferred from the source object to the receiving object and adjusts the first index string in the source object to indicate die units remaining in the source object.

In one example, the system according to present invention further comprises a die bonder device for generating die strings from a die map of the source object.

In another example, the system according to present invention further comprises a die history table for storing index strings and die strings associated with the die units transferred from the source object to the receiving object.

In another embodiment, the present invention relates to a system for tracing die units during manufacturing operations, which includes means for assigning a first index string to a uniquely assigned plurality of die strings in one-to-one correspondence to a plurality of die units, wherein said plurality of die units is associated with a source object, wherein each range of indices encompassed by the first index string identifies one of said plurality of die strings, means for, upon transferring at least some of the die units from the source object to a receiving object, copying the plurality of die strings associated with the plurality of die units from the source object to a receiving object, means for assigning a second index string to the die strings associated with the die units transferred from the source object to the receiving object to indicate die units transferred to the receiving object, and means for adjusting the first index string in the source object to indicate die units remaining in the source object. More specifically, the die strings include wafer ID and die coordinates, wherein the die strings are generated from a die map of the source object, and wherein the die coordinates include X-coordinate and Y-coordinate. In one example, the die strings include wafer ID and a range of number sequence. In one example of the system according to present invention, the source object is a plurality of wafers and the receiving object is a plurality of lead frames. In another example, the source object is a plurality of lead frames and the receiving object is a plurality of magazines.

In one example, the system according to present invention further comprises means for assigning a plurality of user-defined strings in one-to-one correspondence to said plurality of die strings.

In another example, the system according to present invention further comprises means for assigning a die picking order in one-to-one correspondence to said plurality of die string.

In yet another example, the system according to present invention further comprises means for storing said index strings and die strings associated with the die units transferred from the source object to the receiving object.

An example of the present invention is also directed to a computer program product residing on a computer readable medium, the computer program product comprising instructions for causing a computer to assign a first index string to a uniquely assigned plurality of die strings in one-to-one correspondence to a plurality of die units, wherein said plurality of die units is associated with a source object, wherein each range of indices encompassed by the first index string identifies one of said plurality of die strings, upon transferring at least some of the die units from the source object to a receiving object, copy the plurality of die strings associated with the plurality of die units from the source object to a receiving object, assign a second index string to the die strings associated with the die units transferred from the source object to the receiving object to indicate die units transferred to the receiving object, and adjust the first index string in the source object to indicate die units remaining in the source object.

In one example, the computer program product according to the present invention further comprises instructions for causing computer to assign a plurality of user-defined strings in one-to-one correspondence to said plurality of die strings.

In another example, the computer program product according to the present invention further comprises instructions for causing computer to assign a die picking order in one-to-one correspondence to said plurality of die string.

In yet another example, the computer program product according to the present invention further comprises instructions for causing computer to store said index strings and die strings associated with the die units transferred from the source object to the receiving object.

BRIEF DESCRIPTION OF THE DRAWINGS

FIG. 5 illustrates exemplary die data in lots before and after the transfer of die units from one lot to another lot in a split lot transaction.

FIG. 6 illustrates exemplary die data in lots before and after the transfer of die units from one lot to another lot in a merge lot transaction.

DETAILED DESCRIPTION

Figure 1:
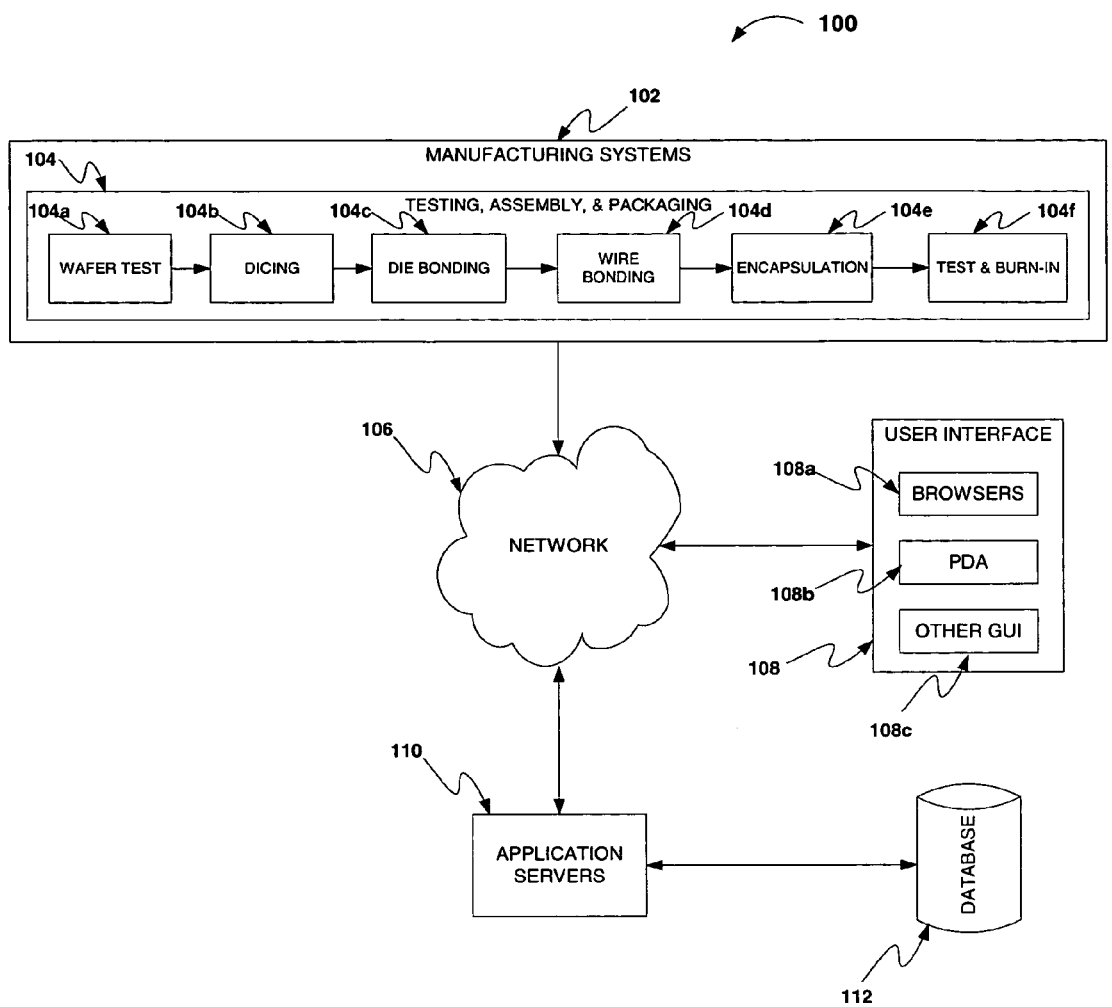
FIG. 1 is an embodiment of an exemplary die-level traceability system in accordance with the present invention.

Embodiments of the present invention provide a die-level traceability system, method and product for facilitating tracing die units during manufacturing operations where, e.g., a portion of one lot is transferred to another lot. Referring now to the drawings, and more particularly, to FIG. 1, there is shown a die-level traceability system, generally designated 100, for facilitating tracing die units during material transfer from, for example, one factory or lot to another and efficiently maintaining correspondence between die data and an individual die during, e.g., a lot transfer process. System 100 can include one or more manufacturing system 102, testing, assembly and packaging system 104 (e.g. FLEX™ Test System, Teradyne, Inc., Boston, Mass.), host network 106, user interface 108, application server 110 (e.g. IBM WebSphere® Application Server, IBM Corporation, Armonk, N.Y.), and database 112 (e.g. Oracle, Oracle Corporation, Redwood Shores, Calif.). Testing, assembly and packaging system 104 can include devices for performing operations related to, for example, wafer testing 104a (e.g. APT System, Keithley Instruments, Inc., Cleveland, Ohio), dicing 104b (e.g. Dynatex Wafer Dicing System, Dynatex International, Santa Rosa, Calif.), one wire bonding 104c (e.g. Kulicke & Soffa, Willow Grove, Pa.), encapsulation 104d, and test and burn-in 104e. Any number of different devices and processes are contemplated for use with system 100 above, as will readily be recognized by those skilled in the art.

In one or more embodiments of the present invention, the application server 110 generates unique die IDs for each die unit from a user. The application server 110 assigns the die IDs in one-to-one correspondence to the die units. In another embodiment of the present invention the die IDs are generated by the manufacturing system 102. A die ID can be a free-form string (die string) that is user-defined or externally generated by an application or a tool. The die IDs generated are stored in the database 112. The die IDs for die units in a lot or material can be stored as a concatenated string that is assigned to a lot or material object (WIP objects). In one example, the die information can be assigned to the largest WIP object (e.g., lot rather than material) that is associated with a carrier object.

Regarding the tracing of an individual die and its history as it proceeds through the manufacturing system 102 and passed amongst different WIP objects, one or more embodiments of the present invention contemplate that the application server 110 assigns an index string to the die information from a source WIP object in the manufacturing system 102. This index string is, e.g., a numeric range or ranges representing the actual die units in a given WIP object. The manufacturing system 102 transmits data related to the transfer operation of die units performed by each device in the testing, assembly and packaging system 104 to application server 110. In one specific example, die bonder tool 104c can provide information as to which series of dies from a wafer are placed into individual lead frames or magazines. Application server 110 receives this data via the network 106 and assigns another index string to the die information corresponding to the die units transferred to the receiving WIP object. In embodiments of the present invention, all of the die information from the source WIP object is copied to the receiving WIP object. The application server 110 concatenates the index string corresponding to the die units transferred from the source WIP object with the die information in the receiving WIP object and stores the resulting string in the database 112. Further, the application server 110 adjusts the index string corresponding to the die units in the source WIP object to indicate the die units remaining in the source WIP object and stores the resulting string in the database 112. In this fashion, the system 100 traces a particular die's history as it is passed from one WIP object to another, and allows for transferring dies amongst WIP objects by adjusting the index strings rather than adjusting the typically more voluminous die information.

Figure 2:
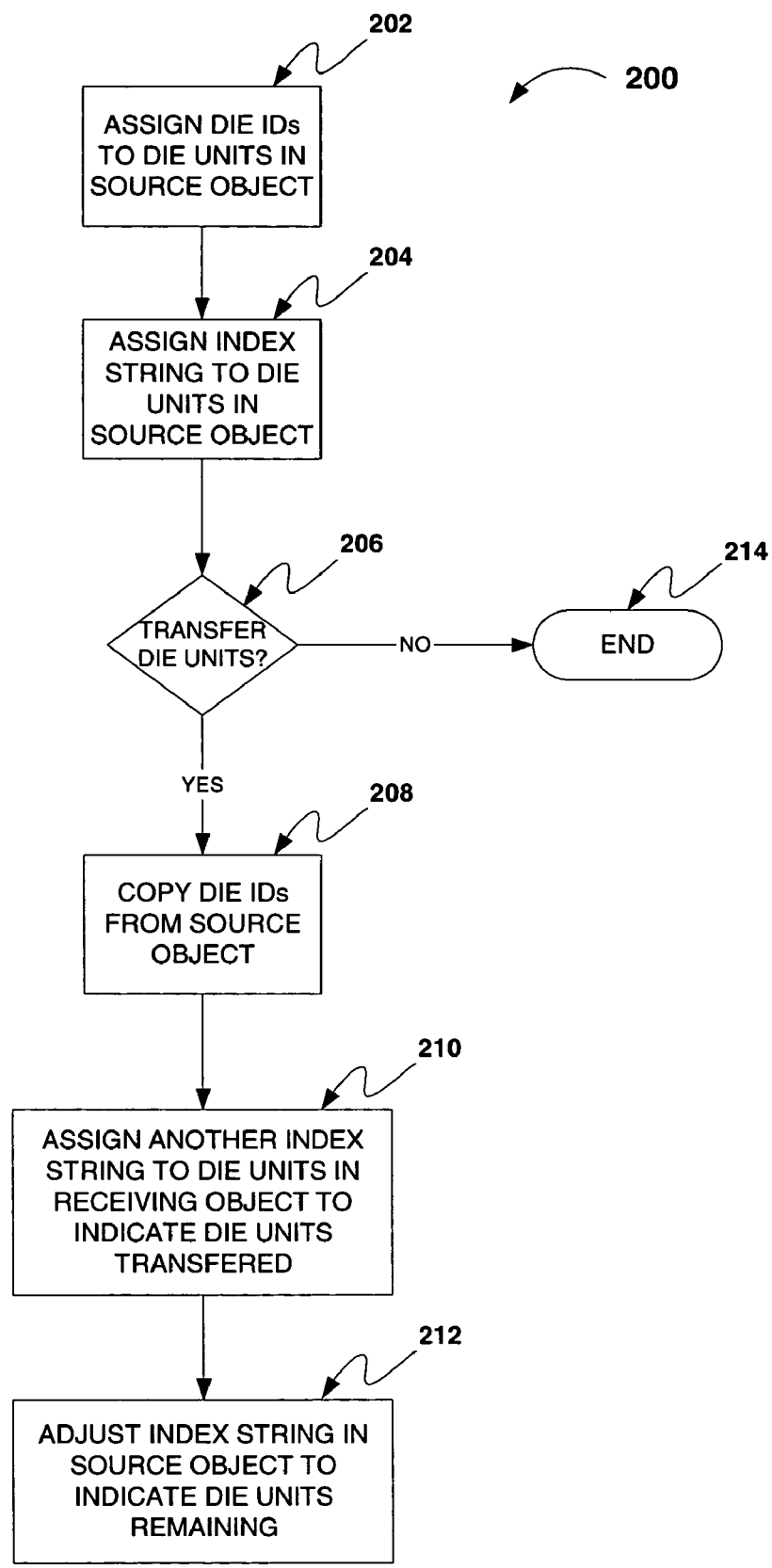
FIG. 2 is a flow diagram in accordance with an exemplary embodiment of the die-level traceability mechanism of the present invention.

FIG. 2, generally at 200, illustrates an exemplary method in accordance with an exemplary embodiment of the mechanism of die-level traceability of the present invention. At step 202, the application server 110 assigns a unique string of individual die IDs to the die units in the lot or material objects. In one embodiment, the application server 110 assigns a sequential range of die IDs to the lot or material objects. Die IDs (and by association, die information, generally) assigned to a WIP object by the application server 110 can be as a result of input from a die map, for example, from the front-end facilities, or are provided by an individual tool, and are envisioned to be of a form that is uniquely identifiable. In one specific example, the die bonder tool 104c can provide die information in the form of coordinates of die units in wafers placed into the individual lead frames or magazines. This die information can include absolute unique coordinates (e.g., <unique wafer ID>_<$X_m$>_<$Y_n$>, <unique wafer ID>_<$X_v$>_<$Y_w$>).

In one or more alternate (and/or overlapping) embodiments of the present invention, the system supports five additional matching strings of die information that could be appended to the die IDs. In one example, the number of items described in each string matches the number of discrete die IDs in the die ID string. The index string assigned to the die IDs also applies to all additional string appended to the die IDs. These additional strings allow the user to define additional die information without having to append data to the discrete die IDs. In effect, it provides the equivalent of having 5 attribute fields for each die ID. These strings along with the index string forms a set of die data. Die data for a lot or material are stored in a concatenated string of individual die IDs, together with a corresponding index string. The indices indicate the actual dies or range of dies held by the lot or material object.

Figure 3:
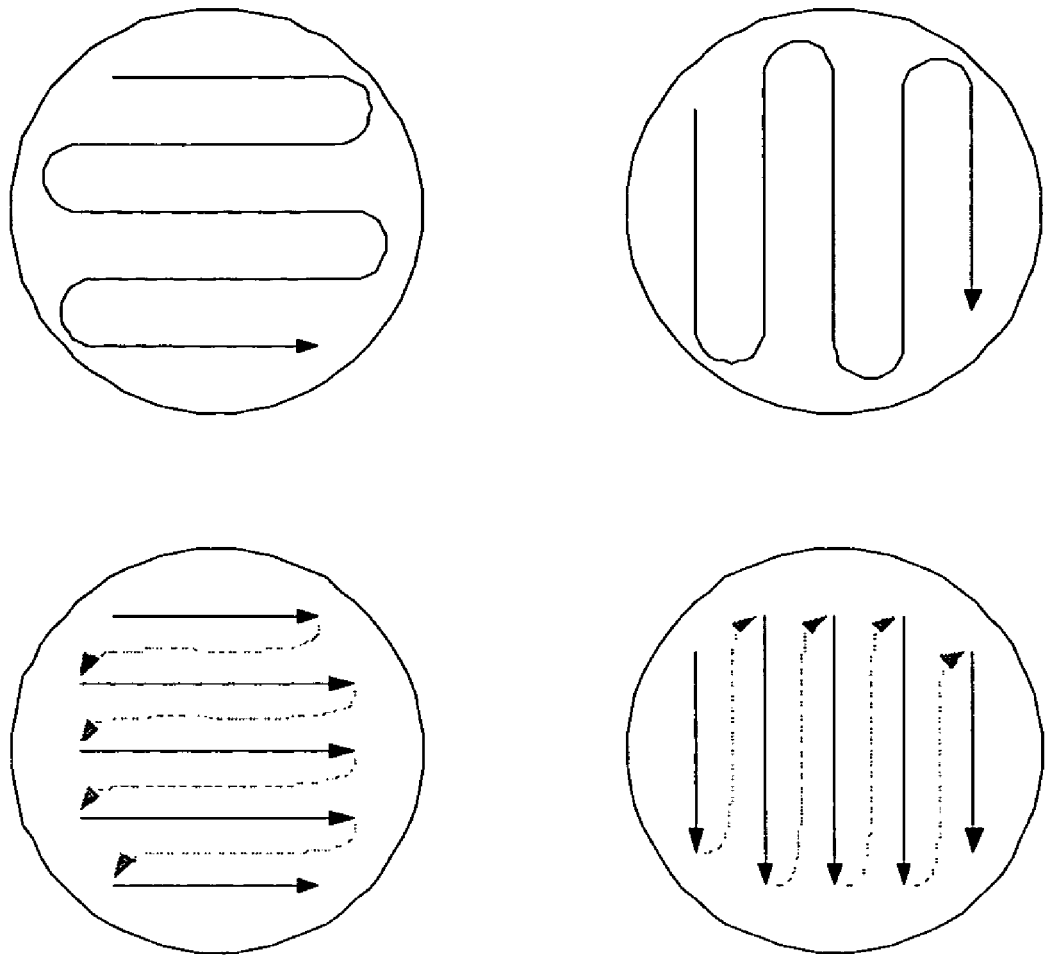
FIG. 3 shows exemplary die pick patterns for a wafer.
Figure 4:
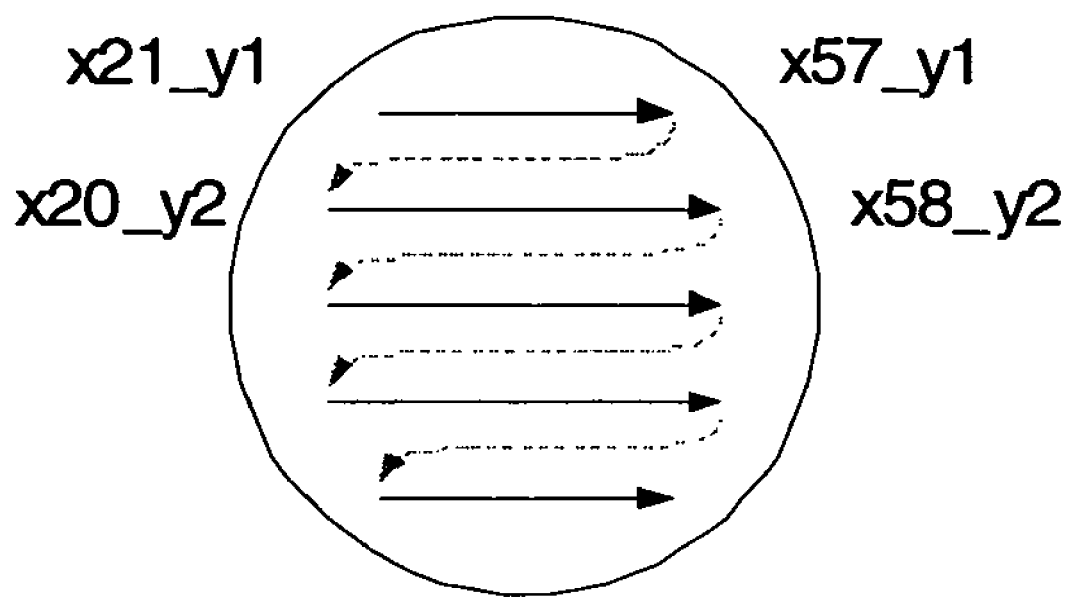
FIG. 4 shows an example of a wafer's die pick order.

In one embodiment of the present invention, the die information includes die maps with picking order data by, e.g., the die-bonder tool when the wafer is not rectangular. FIG. 3 illustrates exemplary die picking patterns for a wafer. The die pick pattern of the die bonder equipment determines the die ID list passed to the lead frame magazines. FIG. 4 illustrates an example of a wafer's die pick order by the die-bonder tool. This die information including the die maps is used if die information formats are in ranges, implying that the die information assigned to a WIP object does not have discrete die IDs that are directly retrievable from the database 112. In one example, the pick pattern information is stored by product type and in another (or overlapping) example the pick pattern information is stored by wafer size.

One or more embodiments of the present invention includes a die picking order table (and use thereof) that stores die coordinate patterns of wafer of a product type. In one example, the die picking order table could be used as a lookup table between a wafer coordinate range and a sequence number range. In one example, the lookup table facilitates the lookup of actual coordinates if the die range information is provided as a numbered range. Table 1 shows an example of a die pick order for the wafer shown in FIG. 4. Whenever this table is used as a lookup, the system strips off the part of the die ID string based on known naming convention. In one example, while searching for "wafer23415_x24_y2", the system will use the "x24_y2" portion of the die ID. For example, if the die bonder equipment indicates the transfer of die units 1 through 480 from wafer "WaferXYZ" to a lead frame magazine "Magazine101", the system retrieves the appropriate pick pattern based on the wafer's product type. For range 1 through 480, the system can generate individual die IDs by concatenating the waferID with the coordinates of each sequence (e.g. "WaferXYZ_x21_y1" for $1^{st}$ die, "WaferXYZ_x22_y1" for $2^{nd}$ die, and so forth). The die data for "Magazine101" is then "WaferXYZ_x21_y1, WaferXYZ_x22_y1, . . . , WaferXYZ_xn_ym" and the index string is "1:480".

TABLE 1

Die Pick Pattern Table

| Die Map Name | Sequence # | Die Coordinate Value |
|---|---|---|
| Product_A_wafer_pattern | 1 | x21_y1 (first row-top left - die #1) |
| Product_A_wafer_pattern | 2 | x22_y1 |
| Product_A_wafer_pattern | 3 | x23_y1 |
| Product_A_wafer_pattern | 4 | x24_y1 |
| . . . | . . . | . . . |
| Product_A_wafer_pattern | 37 | x57_y1 (end first row - die # 37) |
| Product_A_wafer_pattern | 38 | x20_y2 (start 2nd row - die # 38) |
| Product_A_wafer_pattern | 39 | x21_y2 |
| Product_A_wafer_pattern | 40 | x22_y2 |
| Product_A_wafer_pattern | 41 | X23_y2 |
| . . . | . . . | . . . |

In one example, the sequence number for each coordinate in Table 1 could be used to identify individual die IDs after a split transaction. As shown in Table 1, the system can store die information in three parts: the raw coordinate range data, a sequence number range data, and the die map name. In one example, the die information includes die string (e.g., wafer1_x1_y1:wafer1_x3_y42), range data (e.g., 1:480), and die map name (e.g., ProductA_wafer_pattern).

Still referring to FIG. 2, at step 204, the application server 110 assigns an index string to the die units in the WIP object. In one embodiment of the present invention, the index string represents the range of die units in the WIP object. At decision step 206, the system determines whether there is a physical transfer of die units from one WIP object to another. Exemplary operations wherein die units are transferred from one WIP object to another include recording losses, lot split and merge, material transfer, material regrouping within the same lot, remove material from a lot, terminal lot, adjust lot, and the like. If there is a physical transfer of die units from one WIP object to another, then, at step 208, the system copies the die information to a receiving WIP object.

In one or more embodiments of the present invention, the physical transfer of die units occurs during the operation that includes a split lot transaction. In another embodiment of the present invention, the physical transfer of die units occurs during the operation that includes a lot merge operation. In one embodiment of the present invention regarding a split lot transaction, the system, at step 208, will copy the entire parent lot die information to the child lot. In one embodiment of the present invention regarding a merge operation, the system will merge the die information of all merging lots into the target lot. The following example illustrates the split lot transaction:

Parent lot's die data before split:
"lot34456-1.1_x34_y47, lot34456-1.1_x35_y47, lot34456-1.1_x1_y48, . . . , lot34456-1.2_x1_y1"
Range data (index string)=1:5000
User specifies the range of dies transferred to child lots:
Child lot #1 receives:
Die ID string="lot34456-1.1_x34_y47, lot34456-1.1_x35_y47, lot34456-1.1_x1_y48, . . . lot34456-1.2_x1_y1"←unchanged
Range data=1:2500←valid range of dies in the index string
Child lot #2 receives:
Die ID string="lot34456-1.1_x34_y47, lot34456-1.1_x35_y47, lot34456-1.1_x1_y48, . . . lot34456-1.2_x1_y1"←unchanged
Range data=2501:5000←valid range of dies in the index string
Parent lot's die data after split:
"lot34456-1.1_x34_y47, lot34456-1.1_x35_y47, lot34456-1.1_x1_,48, . . . , lot34456-1.2_x1_y1"←unchanged
Range data=0:0←valid range of dies in the string is adjusted to zero Thus, all die ID strings remain the same, and only the index string is changed (as detailed below).

Referring back to FIG. 2, at step 210, the system will assign another index string to the die units transferred to the receiving WIP object. In one embodiment of the present invention, the index string will indicate the die units transferred from the source WIP object to the receiving WIP object. At step 212, the system will adjust the index string assigned to the die units remaining in the source WIP object. In one embodiment, the index string is adjusted to indicate the die units remaining in the source WIP object after the transfer. FIGS. 5 and 6 illustrates exemplary die data in lots before and after the transfer of die units from one WIP object to another (e.g., lot split transaction from LOT1 to LOT2; lot merge transaction between LOT 3 and LOTS 4).

In one or more embodiments of the present invention (and/or environments thereof), the physical transfer of die units occurs during operations that includes moving a lot containing wafer cassettes in the manufacturing system 102 through die bonder 104c and wire bonder 104d, placing dies on lead frames, and placing the lead frame in lead frame magazines. In one example, a material is created to represent one magazine of lead frames. The magazine's die IDs can be assigned to that material. In one example, die information includes:

Die ID string: <user-defined free-format die ID string>
AdditionalString1:
<user-defined free-format additional die information string>
AdditionalString2:
<user-defined free-format additional die information string>
AdditionalString3:
<user-defined free-format additional die information string>
AdditionalString4:
<user-defined free-format additional die information string>
AdditionalString5:
<user-defined free-format additional die information string>
Range data: <range data with respect to the die ID string>

-continued

```
Die map name: [optional] <Die map name> ←die picking order
For example:
For discrete die IDs Die ID string = "lot34456-1.1_x34_y47, lot34456-1.1_x35_y47,
lot34456-1.1_x1_y48,......, lot34456-1.2_x1_y1"
AdditionalString1: "leadframe1,leadframe1,.........., leadframe40"
AdditionalString2: "location-1,location-1,..............., location-3"
AdditionalString3: "wafer-4, wafer-4,..................., wafer-5"
AdditionalString4:
AdditionalString5:
Range data= 1:480
Die map name:
For range coordinate:

Die ID string: "wafer1_x1_y1:wafer1_x3_y42"
AdditionalString1: "leadframe1,leadframe1,.........., leadframe40"
AdditionalString2: "location-1,location-1,..............., location-3"
AdditionalString3: "wafer-4, wafer-4,..................., wafer-5"
AdditionalString4:
AdditionalString5:
Range data: 1:480
Die map name: "ProductA_wafer_pattern" ←die picking order
```

These Die ID data will be assigned to lot or material objects.

In one or more embodiments of the present invention, the changes due to the transfer of die units from one WIP object to another, is recorded in the die history table. In another embodiment, the trail of WIP objects carrying die units including the WIP objects' history facilitates the system to trace the history of die units.

Figure 7:
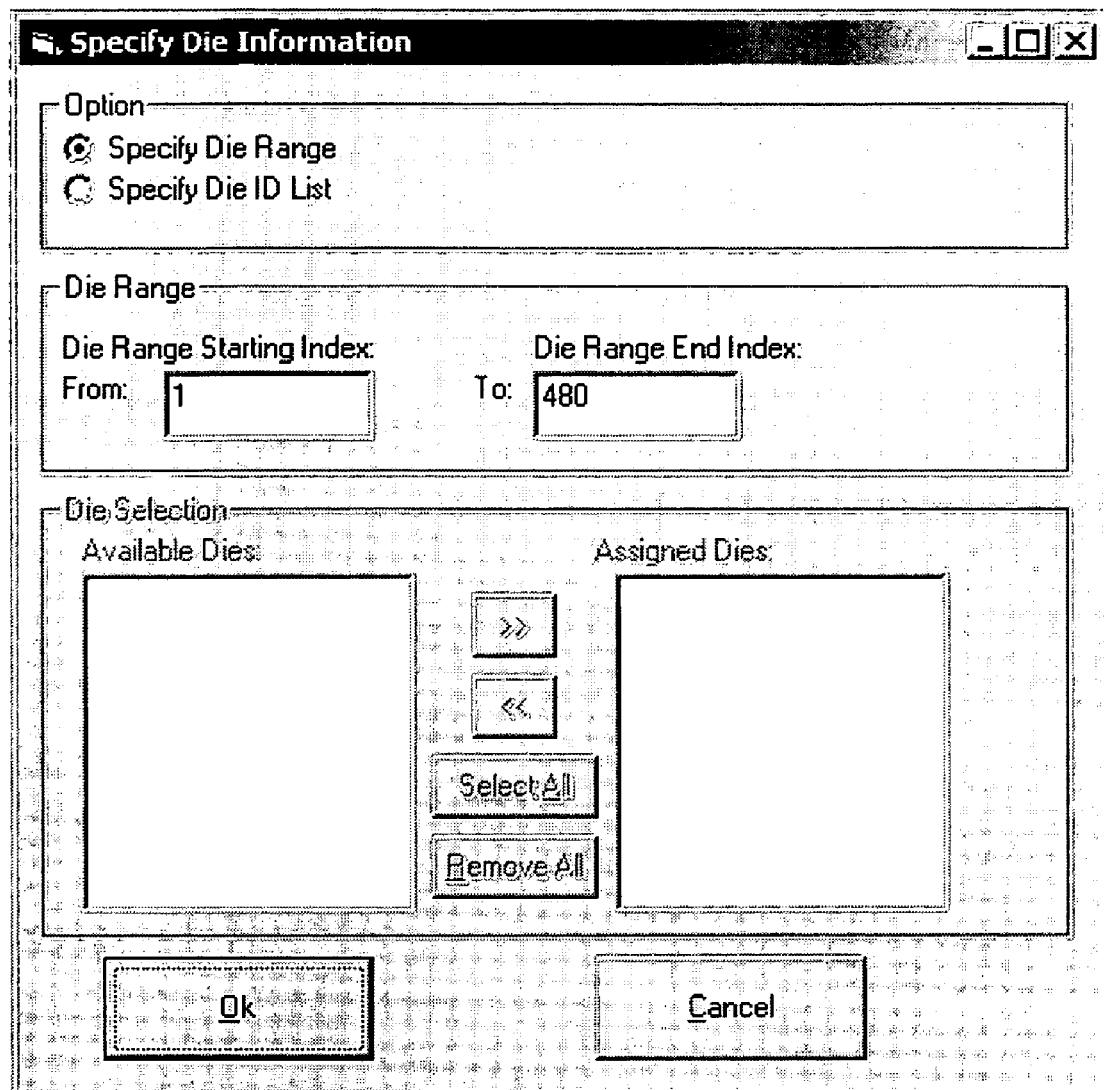
FIG. 7 shows an exemplary graphical user interface (UI) for the present invention that is used for specifying die IDs for Lot or Material Operations.
Figure 8:
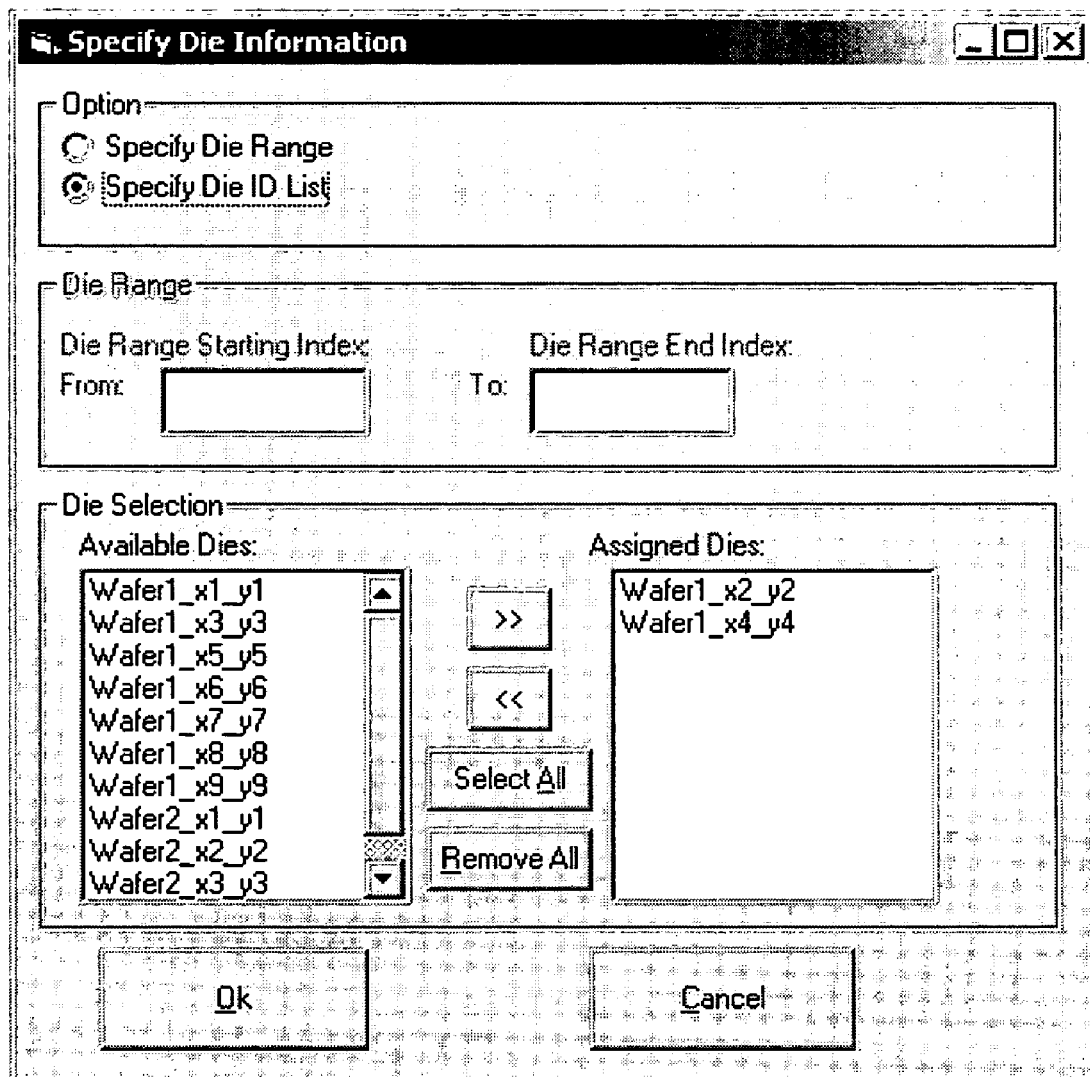
FIG. 8 shows another exemplary graphical user interface for the present invention that is used for specifying die IDs for Lot or Material Operations.

FIG. 7 shows an exemplary Specify Die Information UI that is used for specifying die IDs for Lot or Material Operations. During certain lot or material operations such as Record Losses, Split Lot and Transfer Material, if the selected lot or material has die IDs assigned, the system will provide a user interface to specify Die ID information, either in terms of a range or in the format of individual die ID list as shown in FIG. 7. In one example, when "Specify Die Range" option is selected, as shown in FIG. 7, the system allows the user to specify the indexed range for the die IDs (e.g. dies 1 to 480 go into magazine_1 during material transfer operation). In another example, when "Specify Die ID List" option is selected, as shown in FIG. 8, the lower part of the UI will be enabled and the existing list of Die IDs is displayed in the "Available Dies" list. In another example, the user can select individual Die IDs from the list or select a range from this list box and add it to the "Assigned Dies" list box. Also, as indicated previously, the Die IDs can be generated automatically by the system based upon certain criteria and/or rules.

In one or more embodiments of the present invention, the system can be used to generate the history of a die unit with die data that include die ID in discrete format. In one example, the system uses the UI illustrated in FIG. 9 to retrieve the history of a die unit by:

1. launching the Search Die History UI and providing the die ID and Lot ID (if available);
2. searching the die history table for the die ID by:
   a) For available LotID, retrieving the die ID string based on the target Lot object; determining the index position of the specific die unit in the die ID string; using the die ID string as the search criteria to retrieve all WIP objects that includes the die ID string; and for each WIP object retrieved, verifying if WIP object's index range includes the index of the die unit.
   b) For unavailable LotID, scanning for all WIP objects and checking their die ID strings for a match to the die ID; determining the index position of the specific die in the die ID string; using the die ID string as the search criteria to retrieve all WIP objects that includes the die ID string; and for each WIP object retrieved, verifying if WIP object's index range includes the index of the die unit.
3. displaying the history of specific WIP objects from the list containing the history of the WIP object to show the carriers and equipment that were associated with the object.

Figure 9:
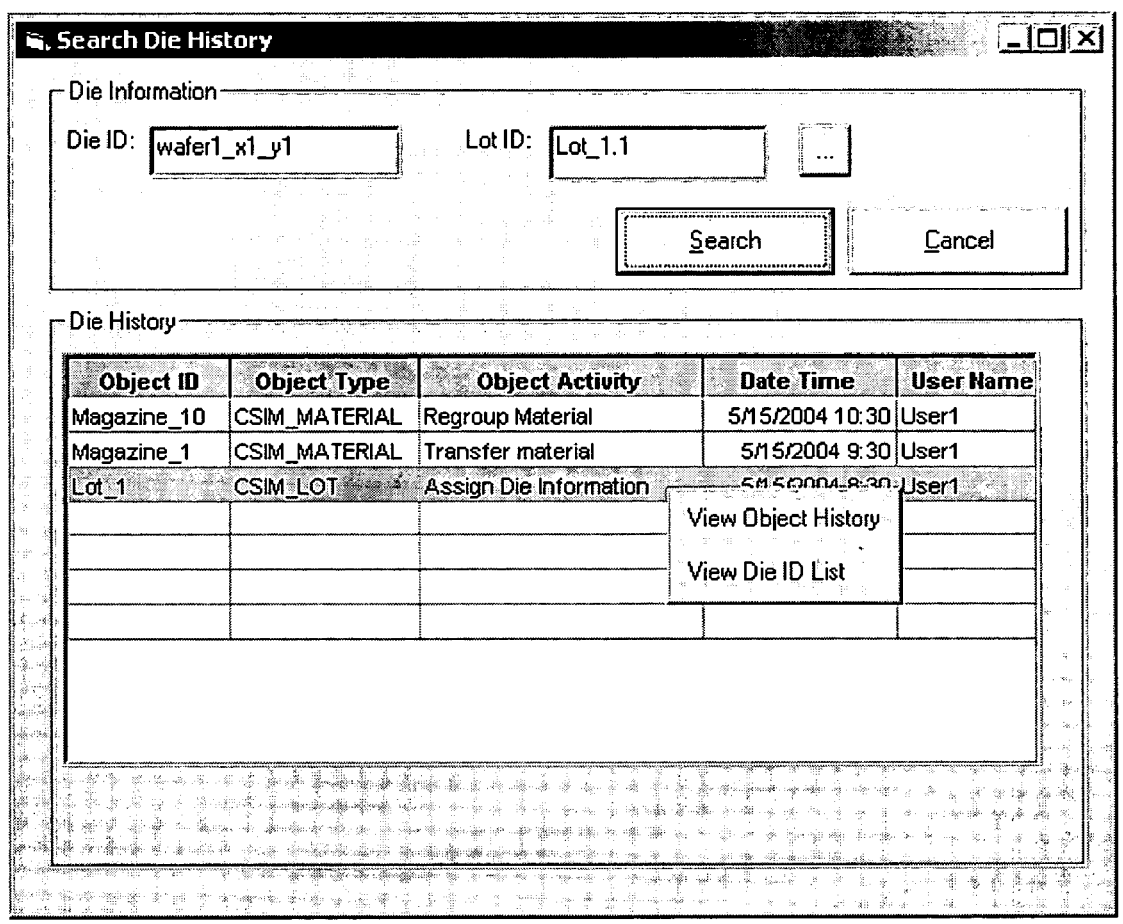
FIG. 9 shows an exemplary graphical user interface for the present invention that is used for retrieving Die Trace Information.

FIG. 9 shows an exemplary Search Die History UI for retrieving Die Trace Information. The UI will allow a search for die traceability information by entering a specific die ID and Lot ID to retrieve trace information. The Input includes Die ID (to be searched): wafer1_x1_y1, and Lot ID: chip's current lot ID. The user can select a row and right-click to launch the history UI for that object.

Parts of the present invention and corresponding detailed description are presented in terms of software, computer programs, or algorithms. Software includes symbolic representations of operations or steps stored in the form of data bits within a computer memory. An algorithm is a sequence of steps leading to a desired result(s). The steps are those requiring physical manipulations of physical quantities. Usually, though not necessarily, these quantities take the form of optical, electrical, or magnetic signals capable of being stored, transferred, combined, compared, and otherwise manipulated. Unless specifically stated otherwise, or as is apparent from the discussion, terms such as "processing" or "determining" or the like refer to the actions and processes of a computer system, or similar electronic computing device, that manipulates and transforms data represented as physical, electronic quantities within the computer system's memories into other data similarly represented as physical quantities within the computer system's memories or registers or other such information storage, transmission or display devices.

Although the above detailed description has shown, described and pointed out fundamental novel features of the invention as applied to the various embodiments discussed above, it will be understood that various omissions and substitutions and changes in the form and details of the device illustrated may be made by those skilled in the art, without departing from the spirit and scope of the invention. The described embodiments are to be considered in all respects only as illustrative and not restrictive.

I claim:

1. A method for tracing die units during manufacturing operations, comprising:
   assigning a first index string to a plurality of die strings that are in one-to-one correspondence to a plurality of die units, wherein the plurality of die units is associated with a source object, wherein ranges of indices encompassed by the first index string identify corresponding die strings of said plurality of die strings;
   upon transferring at least some of the die units from the source object to a receiving object, copying the plurality of die strings associated with the plurality of die units from the source object to a receiving object;
   assigning a second index string to the die strings associated with the die units transferred from the source object to the receiving object to indicate die units transferred to the receiving object;
   adjusting the first index string assigned to the plurality of die strings corresponding to the plurality of die units associated with the source object to create a third index string to indicate die units remaining in the source object; and associating the third index string with a plurality of die strings corresponding to the plurality of die units remaining in the source object.

2. The method according to claim 1, further comprising assigning a plurality of user-defined strings in one-to-one correspondence to said plurality of die strings.

3. The method according to claim 1, further comprising assigning a die picking order in one-to-one correspondence to said plurality of die string.

4. The method according to claim 1, wherein the die strings include wafer ID and die coordinates.

5. The method according to claim 1, wherein each die coordinates includes an X-coordinate and Y-coordinate.

6. The method according to claim 1, wherein the die strings include wafer ID and a range of number sequence.

7. The method according to claim 1, wherein the source object is a plurality of wafers and the receiving object is a plurality of lead frames.

8. The method according to claim 1, wherein the source object is a first plurality of lead frames and the receiving object is a second plurality of magazines.

9. The method according to claim 1, wherein the die strings are generated from a die map of the source object.

10. A method for tracing die units during manufacturing operations, comprising:

uniquely assigning a plurality of die strings and user-defined strings in one-to-one correspondence to a plurality of die units, wherein said plurality of die units is associated with a source object;

assigning a first index string to the plurality of die strings and user-defined strings, wherein ranges of indices encompassed by the first index string identify corresponding die strings of said plurality of die strings and user-defined strings associated with the die units;

upon transferring at least some of the die units from the source object to a receiving object, copying the plurality of die strings and user-defined strings associated with the plurality of die units from the source object to a receiving object;

assigning a second index string to the die strings and user-defined strings associated with the die units transferred from the source object to the receiving object to indicate die units transferred to the receiving object;

adjusting the first index string assigned to the plurality of die strings corresponding to the plurality of die units associated with the source object to create a third index string to indicate die units remaining in the source object; and associating the third index string with a plurality of die strings corresponding to the plurality of die units remaining in the source object.

11. The method according to claim 10, further comprising assigning a die picking order in one-to-one correspondence to said plurality of die string.

12. The method according to claim 10, wherein the die strings include wafer ID and die coordinates.

13. The method according to claim 10, wherein each die coordinates includes an X-coordinate and Y-coordinate.

14. The method according to claim 10, wherein the die strings include wafer ID and a range of number sequence.

15. The method according to claim 10, wherein the source object is a plurality of wafers and the receiving object is a plurality of lead frames.

16. The method according to claim 10, wherein the source object is a plurality of lead frames and the receiving object is a plurality of magazines.

17. The method according to claim 10, wherein the die strings are generated from a die map of the source object.

18. A system for tracing die units during manufacturing operations comprising:

a processor to assign a first index string to a uniquely assigned plurality of die strings in one-to-one correspondence to a plurality of die units, wherein said plurality of die units is associated with a source object, wherein indices within the first index string identify corresponding die strings of said plurality of die strings;

a tracking mechanism to track at least some die units transferred from the source object to a receiving object, wherein said tracking mechanism:

copies at least some die strings associated with the die units transferred from the source object to the receiving object;

assigns a second index string to the die strings associated with the die units transferred from the source object to the receiving object;

adjusts the first index string assigned to the plurality of die strings corresponding to the plurality of die units associated with the source object to create a third index string to indicate die units remaining in the source object; and associates the third index string with a plurality of die strings corresponding to the plurality of die units remaining in the source object.

19. The system according to claim 18, further comprising a die bonder device for generating die strings from a die map of the source object.

20. A system for tracing die units during manufacturing operations comprising:

means for assigning a first index string to a uniquely assigned plurality of die strings in one-to-one correspondence to a plurality of die units, wherein said plurality of die units is associated with a source object, wherein ranges of indices encompassed by the first index string identify corresponding die strings of said plurality of die strings;

means for, upon transferring at least some of the die units from the source object to a receiving object, copying the plurality of die strings associated with the plurality of die units from the source object to a receiving object;

means for assigning a second index string to the die strings associated with the die units transferred from the source object to the receiving object to indicate die units transferred to the receiving object;

means for adjusting the first index string assigned to the plurality of die strings corresponding to the plurality of die units associated with the source object to create a third index string to indicate die units remaining in the source object; and means for associating the third index string with a plurality of die strings corresponding to the plurality of die units remaining in the source object.

21. The system according to claim 20, further comprising means for assigning a plurality of user-defined strings in one-to-one correspondence to said plurality of die strings.

22. The system according to claim 20, further comprising means for assigning a die picking order in one-to-one correspondence to said plurality of die string.

23. The system according to claim 20, wherein the die strings include wafer ID and die coordinates.

24. The system according to claim 20, wherein the die coordinates include X-coordinate and Y-coordinate.

25. The system according to claim 20, wherein the die strings include wafer ID and a range of number sequence.

26. The system according to claim 20, wherein the source object is a plurality of wafers and the receiving object is a plurality of lead frames.

27. The system according to claim 20, wherein the source object is a plurality of lead frames and the receiving object is a plurality of magazines.

28. The system according to claim 20, wherein the die strings are generated from a die map of the source object.

29. A computer program product residing on a computer readable medium, the computer program product comprising instructions for causing a computer to:

assign a first index string to a uniquely assigned plurality of die strings in one-to-one correspondence to a plurality of die units, wherein said plurality of die units is associated with a source object, wherein ranges of indices encompassed by the first index string identify corresponding die strings of said plurality of die strings;

upon transferring at least some of the die units from the source object to a receiving object, copy the plurality of die strings associated with the plurality of die units from the source object to a receiving object;

assign a second index string to the die strings associated with the die units transferred from the source object to the receiving object to indicate die units transferred to the receiving object;

adjusting the first index string assigned to the plurality of die strings corresponding to the plurality of die units associated with the source object to create a third index string to indicate die units remaining in the source object; and associating the third index string with a plurality of die strings corresponding to the plurality of die units remaining in the source object.

30. The computer program product according to claim 29, further comprising instructions for causing computer to assign a plurality of user-defined strings in one-to-one correspondence to said plurality of die strings.

31. The computer program product according to claim 29, further comprising instructions for causing computer to assign a die picking order in one-to-one correspondence to said plurality of die string.

* * * * *

UNITED STATES PATENT AND TRADEMARK OFFICE
CERTIFICATE OF CORRECTION

| | | |
|---|---|---|
| PATENT NO. | : 7,343,214 B2 | Page 1 of 1 |
| APPLICATION NO. | : 11/247196 | |
| DATED | : March 11, 2008 | |
| INVENTOR(S) | : Horne Loong Koh | |

It is certified that error appears in the above-identified patent and that said Letters Patent is hereby corrected as shown below:

In column 13 at line 1 delete "20" and insert --23--

Signed and Sealed this

Thirteenth Day of April, 2010

David J. Kappos
*Director of the United States Patent and Trademark Office*